Oct. 24, 1950            J. NAMET            2,527,227

CABLE CONNECTOR

Filed Jan. 23, 1947

INVENTOR
JULIUS NAMET

BY *Hyde, Meyer, Baldwin & Doran*

ATTORNEYS

Patented Oct. 24, 1950

2,527,227

UNITED STATES PATENT OFFICE 2,527,227

CABLE CONNECTOR

Julius Namet, Freedom, Ohio

Application January 23, 1947, Serial No. 723,866

3 Claims. (Cl. 285—6.5)

This invention relates to connectors for the support and the retention of electrical conductors or cables in the knock-out openings of outlet boxes.

The present invention has for its primary object the provision of a cable connector which is characterized by its structural simplicity, its economy of manufacture, and the improved manner in which it performs its intended function.

A further object of the present invention is the provision of a cable connector having a tubular body provided with longitudinal grooves to receive the cable to be supported and retained by the connector.

A further object of the present invention is the provision of a cable connector in which the cable-receiving grooves of the body portion thereof are formed by longitudinally fluting or corrugating such body portion.

A further object of the present invention is the provision of a cable connector in which the longitudinally grooved body portion thereof is of readily deformable material, the deformation of such body portion achieving the two-fold function of (a) clamping the cable to be supported and retained in the grooves of such body portion and (b) of clamping the connector in the outlet box opening through which the cable and the connector extend.

A further object of the present invention is the provision of a cable connector in which deformation of the body portion thereof, to retain a cable therein and to retain the connector in an outlet box opening, and reformation of such body portion to release the cable and, if desired, to permit the connector to be removed from such outlet box opening, can be easily, quickly and conveniently effected by the use of a pair of pliers or the like.

A further object of the present invention is the provision of a cable connector which is of a size to fit the standard knock-out openings of outlet boxes and which is adapted for use with cables of varying size and shape.

Further objects of the present invention and certain of its practical advantages will be referred to in or will be evident from the following description of one embodiment of the invention, as illustrated in the accompanying drawing, in which Fig. 1 is a perspective view of one form of cable connector embodying the present invention;

Figure 4:
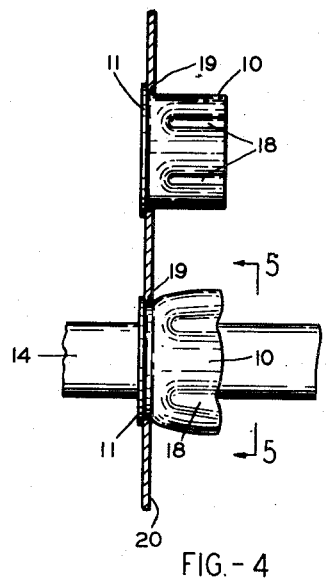
Figure 1:
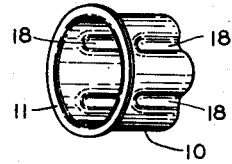
Figure 2:
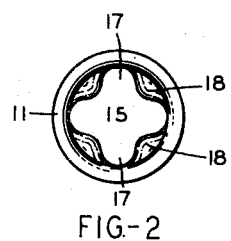
Fig. 2 is a view of the flanged end thereof.
Figure 3:
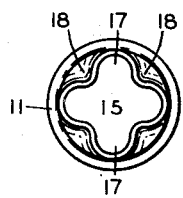
Fig. 3 is a view of the other end thereof.
Figure 5:
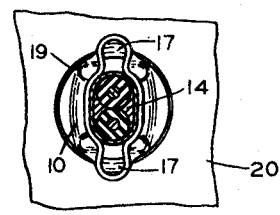

Fig. 4 is a fragmentary cross-sectional view of an outlet box cover or wall having two conventional knock-out openings in which are located two cable connectors of the form illustrated in Figs. 1 to 3 inclusive, one such connector being in its initial undeformed condition and the other such connector being in deformed condition for the retention therein of the cable extending therethrough and for the retention of the connector in its outlet box opening; and Fig. 5 is a detail view on the line 5—5 of Fig. 4.

Before specifically describing the cable connector here illustrated, it is to be understood that the invention here involved is not limited to the particular form of connector here shown, as connectors embodying the present invention may take various forms. It also is to be understood that the terminology or phraseology herein used is for purposes of description and not of limitation, the scope of the present invention being denoted by the appended claims.

For the disclosure of one embodiment of the present invention, there is here illustrated a cable connector having a tubular body portion 10 of readily deformable sheet metal, such as aluminum or the like. At one end thereof, said body portion is provided with a permanent abutment, which here is in the form of an outwardly extending annular flange 11. Preferably and as here shown, said abutment flange is integral with the body portion 10 although, if desired, such flange may be a separate member welded or otherwise rigidly secured to the body portion 10 at one end thereof.

For positive retention of a cable, such as the cable 14, Figs. 4 and 5, in the passageway 15 of the connector body portion, such passageway is provided with a plurality of longitudinally extending cable-receiving grooves 17. Obviously, the number and the spacing of such grooves may be varied as desired, but as here shown, there are four such grooves, equally spaced about the passageway 15 with the consequent provision of two pairs of such grooves, the grooves of each pair being diametrically opposed and the two pairs having a right-angular relationship.

In the present embodiment of the invention, the cable-receiving grooves 17 extend from the non-flanged end of the connector body portion and have a length somewhat greater than half that of such body portion. This is adequate for proper reception of a cable by the grooves, although the length of such grooves may be varied, as desired.

For simple and economical provision of the cable-receiving grooves 17, the non-flanged end section of the connector body portion is merely fluted or corrugated, as best shown in Figs. 1 and 3, the circumferentially spaced inwardly disposed and longitudinally extending flutes or ribs 18 providing, of course, the outwardly disposed and longitudinally extending cable-receiving grooves 17 of the passageway 15.

In the use of the present cable connector, it is positioned in an outlet box knock-out opening, such as in one of the two openings 19 of the fragmentarily shown outlet box cover or wall 20 of Figs. 4 and 5, with the abutment flange 11 of the connector in abutting contact with said cover or wall, as shown. As will be evident from Fig. 4, the connector body portion 10, when undeformed, has a diameter just slightly smaller than that of the knock-out opening through which it extends, with the connector flange 11 having a diameter somewhat larger than that of said opening to constitute an abutment for limiting endwise movement of the connector in the direction in which its body portion projects. As will be readily understood, the connector body portion may project either into or out of the outlet box, an outward projection of said body portion being preferable, as will hereinafter appear.

The cable to be supported and retained by the connector thus positioned in the outlet box opening is then extended through the connector passageway 15, and the end of the connector properly located in the outlet box for the desired electrical connection. Thereafter, the projecting body portion of the connector is compressively deformed in the manner shown in Figs. 4 and 5, with the simultaneous accomplishment of the two-fold function of rigidly securing the cable in the connector passageway and of rigidly securing the connector in the outlet box opening in which it is positioned. Inasmuch as the connector is of readily deformable material, such as sheet aluminum or the like, the compressive deformation of its projecting body portion can be easily, quickly and conveniently effected, the deformation preferably being effected by the use of a pair of pliers. If the connector body portion projects outwardly from the outlet box, the deformation of such body portion can be effected somewhat more conveniently, although there is ample access to the interior of the outlet box for deformation of the connector body portion if it is desired to have such body portion project into the box.

As will be evident from Figs. 4 and 5, the compressive deformation of the connector body portion firmly or tightly clamps the cable in two opposed grooves 17 of the connector passageway 15, and also flattens out the connector body portion to such an extent that the outlet box cover or wall is firmly or tightly clamped between the connector flange 11 on one side thereof and the flattened out connector body portion on the other side thereof, the deformed connector body portion constituting, of course, an opposing abutment to the connector flange 11. The retention of the cable in the connector and the retention of the connector in the knock-out opening of the outlet box are thus easily, quickly and simultaneously effected by simple compressive deformation of the connector body portion, a deformation which can be readily and conveniently effected merely by the use of a pair of pliers.

Should release of the cable be desired, it merely is necessary to reform or restore the connector body portion to substantially its original contour, a reverse operation which can be readily effected by a pair of pliers, as will be readily understood.

From the foregoing description thereof, it is quite evident that the present cable connector is characterized by its structural simplicity, the economy of its manufacture and the ease by which a cable is retained therein and the connector retained in an outlet box knock-out opening. The connector is adapted for use with cables of varying size and shape, and its body portion is devoid of weakening slots and the like.

To those skilled in the art to which the present invention relates, other features and advantages of cable connectors embodying the present invention will be obvious.

Having described my invention, I claim:

1. A cable connector for outlet boxes, comprising a one-piece tubular member of relatively thin metal provided at one end thereof with an integral outwardly extending flange, the other end portion of said member being shaped to provide such end portion with opposed longitudinally extending cable-receiving grooves, the grooved end portion of said member being endwise insertable into an outlet box wall opening with the length of said member such that when the flange thereof is in contact with one side of said outlet box wall the grooved end portion of said member projects beyond the other side of said wall, the grooved character of said projecting end portion enabling it to be readily deformed to tightly clamp a cable in the grooves thereof and to cause said end portion when so deformed to serve as an opposing abutment to said flange for the clamping therebetween of said outlet box wall.

2. A cable connector for outlet boxes, comprising a one-piece tubular member of relatively thin metal provided at one end thereof with an integral outwardly extending flange, the other end portion of said member being shaped to provide such end portion with pairs of opposed and longitudinally extending cable-receiving grooves, the plane of the grooves of one pair being at substantially right angles to the plane of the grooves of another pair, the grooved end portion of said member being endwise insertable into an outlet box wall opening with the length of said member such that when the flange thereof is in contact with one side of said outlet box wall the grooved end portion of said member projects beyond the other side of said wall, the grooved character of said projecting end portion enabling it to be readily deformed to tightly clamp a cable in the grooves thereof and to cause said end portion when so deformed to serve as an opposing abutment to said flange for the clamping therebetween of said outlet box wall.

3. An electrical fitting adapted to connect a wire cable to a switch box opening comprising a portion adapted to fit the opening and of substantially the same diameter thereof, a flange for preventing the passage of the fitting through the opening from one direction, and a reduced diameter portion adapted to be crimped extending from the portion seated in the opening which upon being crimped will have tight engagement with the cable within the fitting and will be expanded to provide portions for preventing the movement of the fitting through the opening in the opposite direction.

JULIUS NAMET.

REFERENCES CITED

The following references are of record in the file of this patent:

UNITED STATES PATENTS

| Number | Name | Date |
| --- | --- | --- |
| 393,334 | Judd | Nov. 20, 1888 |
| 1,150,407 | Wells | Aug. 17, 1915 |
| 2,311,427 | Winkelmeyer | Feb. 16, 1943 |